United States Patent [19]
Brownlie

[11] Patent Number: 5,136,576
[45] Date of Patent: Aug. 4, 1992

[54] TRANSMISSION SYSTEM

[75] Inventor: John D. Brownlie, Woodbridge, England

[73] Assignee: British Telecommunications public limited company, United Kingdom

[21] Appl. No.: 399,458
[22] PCT Filed: Jan. 13, 1988
[86] PCT No.: PCT/GB88/00019
  § 371 Date: Sep. 1, 1989
  § 102(e) Date: Sep. 1, 1989
[87] PCT Pub. No.: WO88/05621
  PCT Pub. Date: Jul. 28, 1988

[30] Foreign Application Priority Data

Jan. 13, 1987 [GB] United Kingdom ............... 8700669

[51] Int. Cl.⁵ ......................... H04B 3/20; H04L 5/16
[52] U.S. Cl. ........................... 370/31; 370/24; 370/29
[58] Field of Search ............ 370/24, 29, 30, 31, 370/32, 32.1; 375/7, 8

[56] References Cited

U.S. PATENT DOCUMENTS 3,404,219 10/1968 Couturier ........................... 370/41
4,841,521 6/1989 Amada et al. ...................... 370/31

FOREIGN PATENT DOCUMENTS 0091014 10/1983 European Pat. Off. .
0182096 5/1986 European Pat. Off. .
2268411 11/1975 France .

Primary Examiner—Douglas W. Olms
Assistant Examiner—Wellington Chin
Attorney, Agent, or Firm—Nixon & Vanderhye P.C.

[57] ABSTRACT

A method of transmission between a first and a second station via a transmission link in at least part of which transmissions in two directions travel over a common path, transmissions by the second station occupying a bandwidth which is the same as or at least partially overlaps the bandwidth occupied by transmissions by the first station, in which the first station includes an echo canceller and which simultaneous transmission by the stations occur only during periods which immediately follow a period of transmission by the first station alone and are of short duration relative to the rate of change of the echo characteristics of the path. The bandwidth overlap may be intentional or may be the result of imperfect filtering in a frequency division duplex system.

16 Claims, 1 Drawing Sheet

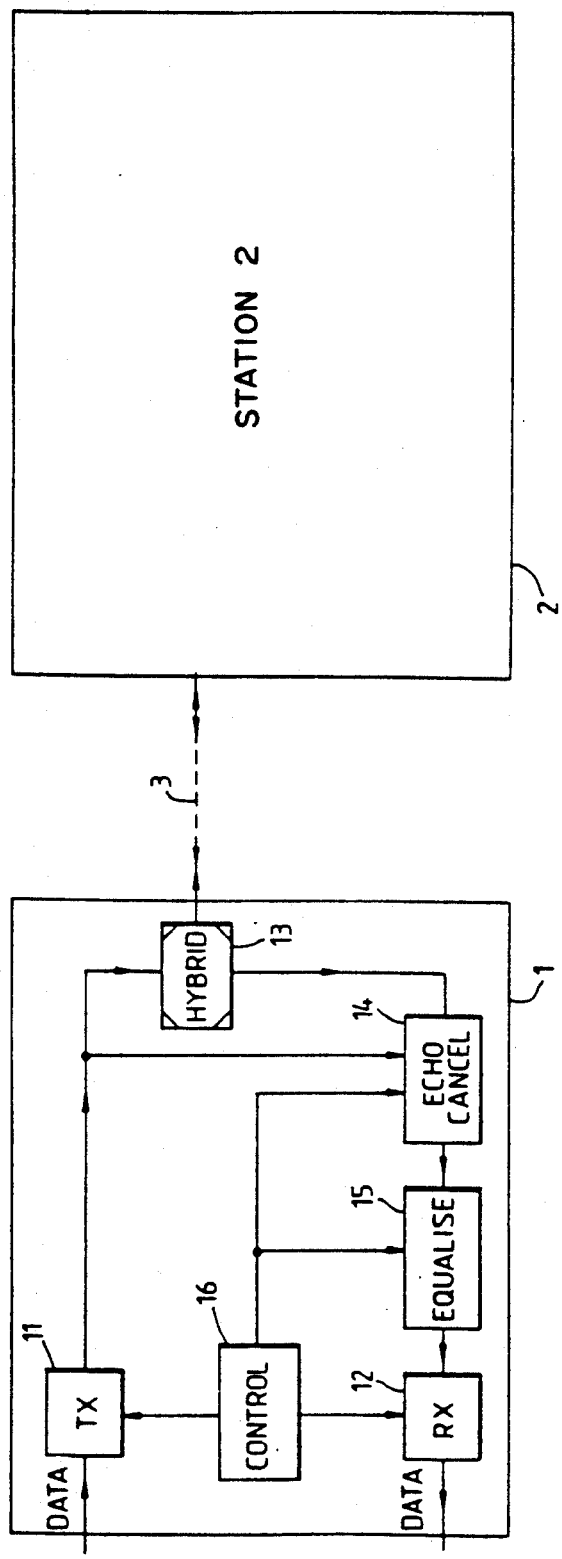
FIG. 1A
FIG. 1B
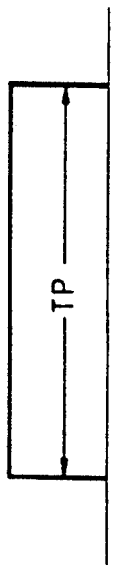
FIG. 2A
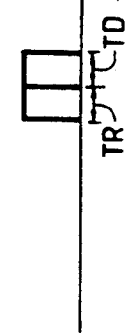
FIG. 2B

TRANSMISSION SYSTEM

The present invention relates to transmission systems in which signals are transmitted over a path which is wholly or partially common to both directions of transmission between two stations. Such is the case, for example, where a two-wire telephone channel is employed.

Often it happens that, for some unknown time period TP, Communication is required primarily in the direction from one station to the other, but during this period it must be possible for the latter station to transmit short messages back to the former. It is often desired e.g. for reporting errors in forward transmission, that such messages should be transmitted as quickly as possible. Commonly, too, it is desired to maximise the data rate (in a digital system) or available bandwidth (in an analogue system) in the forward direction.

Frequency division duplex systems such as the CCITT Group II facsimile transmission standard in which a small portion of spectrum is reserved for reverse signalling inherently involve a reduction of forward channel capacity and a slow return channel, as well as stringent filtering requirements, whilst echo cancelling duplex systems (e.g. CCITT V32) provide rapid return channel signalling but reduce the maximum forward signal to noise ratio (and hence data rate) due to uncancelled talker echo (particularly in the presence of phase roll).

According to one aspect of the present invention there is provided a method of transmission between first and second stations via a transmission link in at least part of which transmissions in two directions travel over a common path, transmissions by the second station occupying a bandwidth which is the same as or at least partially overlaps the bandwidth occupied by transmissions by the first station, in which the first station includes an echo canceller and in which simultaneous transmission by the stations occurs only during periods which immediately follow a period of transmission by the first station alone and are of short duration relative to the rate of change of the echo characteristics of the path. The bandwidth overlap referred to may be intentional, or may be the result of imperfect filtering in a frequency division duplex system.

This aspect of the invention is based on the realisation that, following a period of transmission by the first station alone, the station's echo canceller can be well adapted to the characteristics of the link and, initially, by the first station good quality reception of transmissions by the second station can therefore, be achieved. Because the first station's echo canceller cannot adapt so readily to variations in transmission path characteristics (indeed, in most cases its state would be "frozen" or switched to a slow adapting condition) this situation does not persist. If, however, the time for which the second station is permitted to transmit is sufficiently brief, this is not a problem. Thus, over a given path, a higher data rate/signal to noise ratio can be achieved than would be possible with full duplex.

Of course, assuming that the forward data rate (or required signal-to-noise ratio) is greater than that which would be possible using full duplex, it is to be expected that the forward transmission by the first station will be corrupted by the second station's transmission, since the latter, having been silent, will not have available a well-trained echo canceller. For many applications, however—for example for error reports by the second station, or where the second station desires to initiate a reversal of the primary transmission direction—this is unimportant since the corrupted transmission either can be repeated, or is unwanted.

Thus the invention can be of benefit even in cases where variation of the transmission path characteristics is not a problem and in the second aspect of the invention there is provided a method of transmission between first and second stations via a transmission link in at least part of which transmissions in two directions travel over a common path, transmissions by the second station occupying a bandwidth which is the same as or at least partially overlaps the bandwidth occupied by transmissions by the first station, in which the first station includes an echo canceller and is arranged to transmit data at a rate in excess of that permitting duplex transmission, in which simultaneous transmission by the stations occurs only during brief periods which immediately follow a period of transmission by the first station alone, the total duration of such brief periods being not more than 25%, and preferably 10% of the total transmission time.

Examples of control functions are a change of data rate or change of the nature of information which is to be sent.

In a further aspect, the invention provides a transmission system comprising first and second stations connected via a transmission link in at least part of which transmission in two directions travel over a common path, the first station having a transmitter, a receiver and an echo canceller and the second station having at least a transmitter and receiver, and transmissions by the second station occupying a bandwidth which is the same as or at least partially overlaps the bandwidth occupied by transmissions by the first station, in which: the second station is operable in response to a detected error in the signals received from the first station to transmit, simultaneously with transmission by the first station, a signal of brief duration relative to the rate of change of the echo characteristics of the path; and the first station is operable in response to such signal to repeat transmission of at least the portion of its transmission indicated by the signal as being in error and the portion of its transmission during which transmission and reception of the signal occurred.

In another aspect of the invention there is provided a transmission system comprising first and second stations each having a transmitter, a receiver and an echo canceller, and a transmission link in at least part of which transmissions in two directions travel over a common path, transmissions by the second station occupying a bandwidth which is the same as or at least partially overlaps the bandwidth occupied by transmissions by the first station in which:

information is received either, in a forward direction, by the second station from the first or, in a reverse direction, by the first station from the second; and repeated switching between the forward and reverse directions is effected by the transmission of a signal by the station which is receiving, the station which is transmitting responding to such signal by ceasing transmission.

One embodiment of the present invention will now be described, by way of example, with reference to the accompanying drawings, in which:

FIGS. 1A and 1B are a block diagram of one form of transmission system according to the invention; and FIGS. 2A and 2B are a timing diagram.

FIGS. 1A and 1B show a digital transmission system (e.g. for facsimile transmission) in which first and second stations 1, 2 are connected via a 2-wire telephone circuit 3. Station 1 has a transmitter 11, receiver 12, hybrid circuit 13, adaptive echo canceller 14 adaptive equaliser 15, and control means 16. Similar components are provided in station 2.

It will be assumed that the primary direction of transmission is from station 1 to station 2, although, as will be seen later, the roles of the two stations may be reversed. Station 1 transmits a page of data during a time interval TP (FIGS. 2A and 2B). If the control means at station 2 recognises a transmission error, it signals this fact rapidly to station 1 by means of a burst of transmission during period TR so as to call for the re-transmission from station 1 of digital data previously received at station 2 with errors in transmission (or of analogue data received by station 2 in some unacceptably corrupted form). In respect of digital data, such practice often follows the so-called GO-BACK-N ARQ protocol. This is relevant to the transmission of a series of data frames each equipped with (typically 16) check bits enabling the receiver to detect most error events within the frame. If, say, the Mth frame is received with errors, then the GO-BACK-N ARQ protocol requires that station 1 should re-transmit frame M followed by all frames following frame M, whether or not these frames have already been transmitted prior to the re-transmission of frame M. With this form of protocol, any frames received by station 2 during its brief transmission period TR plus a subsequent period TD (defined below) will be received again after the re-transmitted frame M has been received. Reliable reception is therefore unnecessary at station 2 during that combined period TR+TD.

High rate transmission from station 1 to station 2 will employ most of the available channel bandwidth over which a good signal to noise ratio is obtained. For the fastest transmission of short messages back from station 2 to station 1, all that same bandwidth should preferably be employed. If a transmission from station 2 lasts only for a period TR (typically of the order of 100 ms), then echoes of this transmitted signal may corrupt the station 2 receiver only for a period TR+TD, where TD is defined as the time for the most delayed frequency component of the transmitted signal to travel from station 2 to station 1 and echo from an impedance mismatch at station 1 back to station 2. In addition to this round-trip transmission time, there will always be some delay inside station 1 between receiving a call to re-transmit a data frame and actually applying that re-transmission from station 1 to the channel. It follows that with the use of GO-BACK-N ARQ protocol, station 2 may employ the whole channel bandwidth for transmitting short messages rapidly back to station 1, without compromising the reliability of data-frame transmissions from station 1 to station 2. The only frames corrupted by the burst of backward transmission are those which will be re-transmitted. During the period TR+TD in which 'talker echoes' of the transmission burst may return to station 2, receiver functions in station 2 such as AGC, carrier recovery, or adaptation of its equaliser should preferably be frozen or set to a slow-adapt mode in order to avoid their possible corruption by echoes which may not be accurately cancelled.

Station 1 must be capable of receiving short messages from station 2 while station 1 is transmitting. Since both directions of transmission employ the same channel bandwidth, this will in most instances require an echo canceller in station 1 to adaptively remove the effect of the transmitted signal in the receiver at station 1. In the example of a 2-wire telephone channel, such 'talker echoes' return as the result of impedance mismatches which are inevitable in any practical circuit. Adaptation of the echo canceller can take place continuously while station 1 is transmitting. It is well-known that such adaptation is greatly assisted in respect of accuracy, lack of jitter and speed of convergence if there is no significant signal at the receiver input other than the talker echoes which the echo canceller is adapting itself to remove.

The above is particularly true when the path taken by echoes in the transmission channel cause them to be, or appear to be, time varying. A common example occurs in a telephone connection which includes a satellite or submarine cable link. Within such a transmission link, the two directions of transmission may be separated into different frequency bands with the result that a net (modulation+demodulation) frequency error in one direction is not exactly cancelled by the net frequency error in the return direction. This imparts a phase roll onto echoes returning back via that link. Most of the echo cancellers at present used in terminal stations connected to the switched telephone network will fail to track and cancel an echo with a frequency offset of about 0.1 Hz if the canceller has to adapt while the station is receiving a wanted signal; in the absence of such a received signal, such echo cancellers will be able to track and approximately cancel such an echo. Similar considerations will apply to cancelling time-varying echoes in other transmission media, although in different ranges of frequency. While station 1 is transmitting and not receiving, its echo canceller can be maintained in a well-adjusted state even if it is dealing with echoes with a modest frequency offset (say of the order of 0.1 Hz when the transmitted modulation rate is about 2400 Baud), or with echoes having some other form of time variation slow compared with the transmitted modulation rate. This will mean that any burst of backward transmission are likely to be received at station 1 without significant interference from the forward signal, even on the most difficult kinds of telephone connection. As soon as a received signal is detected, the echo-canceller adaptation should either be frozen or reduced to a very slow rate, and this should be continued throughout the period of duplex transmission plus a period TD immediately following the receipt of the nominal end of the received signal burst (in order to allow for long-delayed listener echoes). If station 1 receives a signal only for a brief period TR (say 0.5 second in the case of the telephone channel) then the echo canceller in station 1 will maintain cancellation of any phase-rolling echoes over that period certainly to a degree adequate for receiving at a modest bit rate (e.g. 4800 bit/s at 2400 baud in a telephone channel). After nominal cessation of the received signal followed by an interval TD, the echo canceller in station 1 can be switched once more to tracking in a much faster mode in order to 'catch up on' and maintain cancellation of slowly time-varying echoes. Although in principle the station 2 to station 1 transmission could use the same data rate as the forward transmission, in practice, a lower rate may be employed, in order to (a) allow for some station 1 receiver functions not being as accurately adjusted as they would for longer periods of signal reception, (b) to allow for increased quantisation noise which occurs in 2-wire transmission links employing non-linear digital coding (such as A-law PCM) on duplex transmission, and (c) to permit the use at station 1 of a less sophisticated echo canceller than would be required for full symmetric duplex.

In order to receive brief messages at a high bit rate, the receiver at station 1 must also be in a conditioned state. It is envisaged that the receivers at stations 1 and 2 will be trained up at the beginning of transmission. One example of a suitable start-up procedure appears in the CCITT recommendation V32: if station 1 makes the (telephone) call, then station 2 sends a prescribed signal sequence on which both the receiver at station 1 and the echo canceller at station 2 can train up; then station 1 transmits a prescribed signal sequence on which the receiver at station 2 and the echo canceller at station 1 can train up. V32 then defines the way in which full duplex transmission should ensue. In the case of the system shown in FIG. 1, as a result of suitable control messages (sent usually from the 'calling' station to the 'answering' station), one direction of transmission is initially assigned to be the 'forward' direction. Information may also be sent between the stations to indicate the highest data rates that can be received reliably at the two stations given the observed signal/noise ratios following receiver training. Data transmission may then proceed in the designated forward direction at the highest data rate allowed by the relevant receiver.

Suppose, for example, the forward direction is initially from station 1 to station 2. When forward transmission of data is started, the echo canceller at station 2 and the receiver at station 1 must both be frozen. For telephone channels, most receiver functions at station 1 are likely to remain suitable for immediate signal reception, e.g. the gain control, the adaptive equalizer, the sampling-frequency and the carrier frequency. Depending on the period over which no transmission occurs from station 2 to station 1, the sampling-time phase and/or the demodulating carrier phase in station 1 may need readjustment. To this end, each isolated brief transmission from station 2 to station 1 may include a brief preamble signal specially suitable for rapid recovery of sampling-time and carrier phases. This same preamble signal can facilitate prompt and accurate detection of the onset of a received signal burst at station 1. The main priority will be to keep the preamble as brief as possible while allowing reliable detection with low probability of false detections from noise bursts, and accurate enough recovery of sampling and carrier phases for receiving at a modest bit rate in relation to the channel bandwidth (e.g. 4800 bit/s with a signalling rate of 2400 baud in a telephone channel).

Although the above description envisages forward transmission from station 1 to station 2, a practical system may well provide the capability to operate in the reverse sense as well.

In such a system there may follow the requirement during forward operation from station 1 to station 2 to turn the system round to provide forward transmission from station 2 to station 1. This may be intitiated by control messages from either station. In some systems, it may be satisfactory to initiate a turn-round simply by ceasing the existing forward transmission. With telephone channels, a short period of overlapping duplex transmission is often desirable. The instruction to turn round may be carried either in the forward transmission from station 1 to station 2 or in a backward transmission 'burst' from station 2 to station 1. In either instance, a 'backward' transmission from station 2 to station 1 will extend in time and become 'forward' transmission. Transmission from station 1 will then cease (unless a switch to continuous duplex transmission is called for). When the received signal at station 2 ceases, the echo canceller at station 2 can be switched to an adapt mode in which the previously frozen setting of the echo canceller will adapt (within about 0.5 second in a telephone channel) to re-track any echoes which have varied with time since the initial echo canceller training. This will further ensure that station 2 can receive brief bursts of transmission from station 1.

Assuming (for the reasons discussed above) that the burst is at a fairly modest transmission rate, the receiver at station 1 will meanwhile have refined its functions to a point where it will probably become possible to receive at a higher bit rate. The system may provide for the transmission of a fixed number of information bits at the initial modest bit rate followed by an automatic step-up to some data rate which may previously have been determined as the maximum for reliable reception given the signal/noise ratio available to the well-adapted receiver. Alternatively, the time at which, and/or the data rate to which, the step-up should occur may be determined by the receiving station by reference to the currently prevailing signal/noise ratio. Yet another possibility is that the data rate should regularly be stepped in convenient increments up to a maximum determined either previously or by reference to the prevailing signal/noise ratio in the receiver.

Whenever a receiving station needs to exert influence on the transmitted data rate, it may do so by means of a short transmission burst tailored for that, or any other tranmission-control objective. The transmission of such a control-signal burst is likely to corrupt the reception of high-rate data. With a GO-BACK-N ARQ protocol, all such corrupted data will automatically be re-transmitted. Clearly, the bursts should be as brief as possible and the total duration of such bursts should not exceed 10%—(preferably 1%) of the total transmission time.

Receiver functions should always be frozen for the period TR at any burst transmission plus the maximum delay TD for talker echoes returning on the particular channel. Note that the period TD may readily be measured by each station during the initial start-up period (see for example V32).

References above to stations 1 and 2 may of course be interchanged in a consistent manner.

The mode of 'break-in duplex' discussed here may be provided by stations which alternatively and/or from time to time operate in a mode of continuous duplex transmission.

One example of an application which may best be met by the burst duplex mode is the transmission of facsimile over long-delay international circuits on which phase rolling echoes may prevent the receiving of high-data-rate facsimile transmission in the presence of a backward transmission signal (as discussed above). Before and between facsimile transmissions, it may be efficient to use continuous duplex at a much lower rate (e.g. 2400 bit/s symmetric duplex by coded modulation as defined in a co-pending application) for parameter exchange. Changing to a burst duplex mode for facsimile transmission may typically enable a forward transmission rate of 9600, 12000, or 14400 bit/s on such circuits. To achieve such rates with continuous duplex may sometimes be impossible on these circuits, and in other cases possible only with special provision in the facsimile stations for dealing with phase rolling echoes.

The forward bandwidth efficiency available in break-in duplex operation on 2-wire circuits is the same as that available in half duplex operation. Use of echo cancellers in the manner described above does however enable greatly improved system turn-round and operating efficiency compared with half duplex operation. Adapting a station echo canceller only, or primarily, when the station is transmitting without the presence of a received signal, overcomes most of the difficulty in dealing with phase rolling echoes returning from submarine and satellite transmission links. Break-in duplex combines many of the virtues of half duplex and full duplex operation on 2-wire telephone channels.

I claim:

1. A method of transmission between first and second stations via a transmission link in which at least part of the transmissions between the first and second stations occur in two directions over a common path, transmissions by the second station occupying a bandwidth which is the same as or at least partially overlaps the bandwidth occupied by transmissions by the first station, in which the first station includes an echo canceller and in which said two direction transmission by the stations occurs only during periods which immediately follow a period of transmission by the first station alone and are of short duration relative to the rate of change of the echo characteristics of the path.

2. A method according to claim 1 in which the transmission by the second station is a control signal for communicating instructions to the first station.

3. A transmission system comprising first and second stations connected via a transmission link in which at least part of the transmissions between the first and second stations occur in two directions over a common path, the first station having a transmitter, a receiver and an echo canceller and the second station having at least a transmitter and receiver, a control means for detecting errors in received transmissions from the first station and wherein transmissions by the second station occupy a bandwidth which is the same as or at least partially overlaps the bandwidth occupied by transmissions by the first station, in which:

the second station is operable in response to a detected error in the signals received from the first station to transmit, simultaneously with transmission by the first station, a signal of brief duration relative to the rate of change of the echo characteristics of the path;

and the first station is operable in response to receipt of such signal from the second station to repeat transmission of at least the portion of its transmission indicated by said signal of brief duration as being in error and the portion of its transmission during which transmission and reception of said signal of brief duration occurred.

4. A transmission system comprising first and second stations each having a transmitter, a receiver and an echo canceller, and a transmission link in which at least part of the transmission between the first and second stations occur in two directions over a common path, transmission by the second station occupying a bandwidth which is the same as or at least partially overlaps the bandwidth occupied by transmission by the first station in which:

information is received either, in a forward direction, by the second station from the first or, in a reverse direction, by the first station from the second; and repeated switching between the forward and reverse directions is effected by the transmission of a signal by the station which is receiving, the station which is transmitting responding to such signal by ceasing transmission.

5. A transmission system according to claim 3 in which the first station is arranged in operation to estimate during an initial start-up sequence the transmission delays from the first to second and second to first stations, and is operable in response to receipt of the error-indicating signal to perform said repeat transmission by retransmitting that portion of its transmission estimated as containing the error giving rise to said error-indicating signal and the portion of its transmission during which said error-indicating signal occurred.

6. A transmission system according to claim 3 in which the first station is operable in response to receipt of the error-indicating signal to perform said repeat transmission by retransmitting the portion of its transmission indicated by the error-indicating signal as being, or estimated as being, in error and all portions subsequent thereto.

7. A transmission system according to claim 3, in which the second station is arranged to transmit the said signals at a lower data rate than that employed by the first station.

8. A transmission system according to claim 3, in which the second station also includes an echo canceller and both stations are capable of acting as first station or second station.

9. A transmission system according to claim 8 in which:

information is received either, in a forward direction, by the second station from the first or, in a reverse direction, by the first station from the second; and repeated switching between the forward and reverse direction is effected by the transmission of a signal by the station which is receiving, the station which is transmitting responding to such signal by ceasing transmission.

10. A transmission system according to claim 4 in which each station is arranged, upon commencing transmission whilst the other station is transmitting, to do so at a relatively lower data rate, and to switch to a higher data rate following the cessation of transmission by the other station.

11. A transmission system according to claim 3 in which a station is arranged, when commencing transmission, to switch adaptive receive functions from a rapidly adaptive mode to a non-adaptive or slowly adaptive mode.

12. A transmission system according to claim 3 in which a station is arranged, upon receipt during transmission of the commencement of transmission from the other station, to switch its echo canceller from a rapidly adaptive mode to a non-adaptive or slowly adaptive mode.

13. A transmission system according to claim 11 which the stations are arranged in operation to estimate during an initial start-up sequence the sum of the transmission delays from the first to second and second to first stations, and thereby estimate the time for which such switching is to remain effective.

14. A transmission system according to claim 3, which is also capable of operation in full duplex mode, half duplex or asymmetric duplex.

15. A method of transmission between first and second stations via a transmission link in which at least part of the transmission between the first and second stations occur in two directions over a common path, transmissions by the second station occupying a bandwidth which is the same as or at least partially overlaps the bandwidth occupied by transmission by the first station, in which the first station includes an echo canceller and is arranged to transmit data at a rate in excess of that permitting duplex transmission, in which said two direction transmission by the stations occurs only during brief periods which immediately follow a period of transmission by the first station alone, the total duration of such brief periods being not more than 25% of the total transmission time.

16. A method according to claim 15 in which the total duration of the said brief periods in not more than 10% of the total transmission time.

* * * * *